United States Patent [19]
Ruetman

[11] 3,723,431
[45] Mar. 27, 1973

[54] PERCHLORINATED VINYL PYRAZINES

[75] Inventor: Sven H. Ruetman, Walnut Creek, Calif.

[73] Assignee: The Dow Chemical Company, Midland, Mich.

[22] Filed: Jan. 28, 1971

[21] Appl. No.: 110,753

[52] U.S. Cl. ................................260/250 R, 424/250
[51] Int. Cl. ...............................................C07d 51/76
[58] Field of Search ...................................260/250 R

[56] References Cited

UNITED STATES PATENTS 3,625,944  12/1971  Grabowski.........................260/250 R
3,471,496  10/1969  Gulbenk ............................260/250 R Primary Examiner—Nicholas S. Rizzo
Attorney—Griswold & Burdick, S. Preston Jones and C. Kenneth Bjork

[57] ABSTRACT

Compounds corresponding to the formula

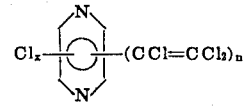

wherein $x$ is 2 or 3, $n$ is 1 or 2 and the sum of $x+n$ is always 4. These compounds are prepared by vapor phase chlorination and have utility as pesticides for the control of a variety of plant, insect, bacterial and fungal pests.

2 Claims, No Drawings

PERCHLORINATED VINYL PYRAZINES

SUMMARY OF THE INVENTION

The present invention is directed to perchlorovinyl pyrazines corresponding to the formula

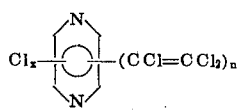

In this and the succeeding formulas, $x$ is 2 or 3, $n$ is 1 or 2 and the sum of $x+n$ is always 4.

The compounds of the present invention are crystalline solids or liquids of low solubility in water and of moderate solubility in common organic solvents.

The compounds of the present invention are useful as pesticides for the kill and control of a wide variety of insect, plant, bacterial and fungal pests such as, for example, crabgrass, pigweeds, yellow foxtail, yellow fever mosquito larva and adults, *Staphylococcus aureus*, *Candida albicans*, *Trichophton mentagrophytes* and *Mycobacterium phlei*.

The pyrazine compounds of the present invention can be prepared by the vapor phase chlorination of an ethyl or vinyl substituted pyrazine. This reaction can be characterized as follows:

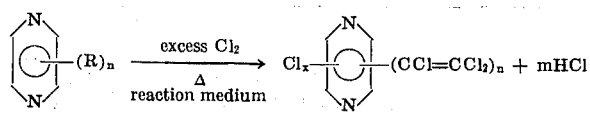

wherein $x$ and n have the same meaning as hereinbefore set forth; R represents ethyl or vinyl, and m corresponds to the total number of hydrogens present on the R groups and in the ring.

In carrying out this preparation, a mixture of the pyrazine feed compound and a diluent, i.e., reaction medium, which has been prevaporized are rapidly and turbulently mixed with an excess over the stoichiometric amount of gaseous chlorine during a brief contact time, usually at a maximum of about 2 minutes, and preferably from about 5 to about 35 seconds, at temperatures of from about 525° to about 650° C. In actual operations, within the disclosed ranges, the contact time usually is varied inversely with the operating temperature. Generally, there is provided between about 30 to about 100 percent excess of chlorine over the stoichiometric requirement needed for the desired product and hydrogen chloride by-product formation.

Representative diluents or reaction media suitable for use in this process are materials which are not detrimentally reactive under the reaction conditions with chlorine, the pyrazine reactant or products including, for example, nitrogen, carbon dioxide, tetrachloroethylene, hexachlorobutadiene, chloroform, carbon tetrachloride and the like. The preferred diluent is carbon tetrachloride.

Operating pressures are not critical and may vary from subatmospheric to somewhat superatmospheric. Atmospheric pressure is satisfactory and is preferred.

In a preferred method of carrying out the preparation of the compounds of the present invention, a pyrazine reactant and diluent are first introduced into an evaporator to produce a vaporized mixture of the pyrazine compound in the inert diluent. The evaporator is maintained at a temperature at which rapid vaporization occurs, usually in the range of from about 200° C. to about 300° C., preferably from about 200° C. to about 225° C. Any vaporizing device may be employed as evaporator but a wiped film evaporator has been found convenient. For efficient operation it is necessary that the rate of reactant and diluent introduction and/or temperature of the evaporator be maintained so as to completely vaporize the reactant pyrazine compound and maintain it in the vaporized state. It has been noted that incomplete vaporization results in decreased yield of the desired chlorinated vinyl pyrazine product. The mixed vapors are conducted from the evaporator and rapidly and turbulently mixed with the gaseous chlorine.

Preferably, this mixing occurs just prior to entry into a chlorinating reactor in which the resulting gaseous mixture is subjected to a turbulent flow under the temperature and time conditions set forth hereinbefore. Ordinarily, a turbulence sufficient to provide a Reynolds number of from about 800 to about 2,000 is used and an inlet vapor velocity of about 1,200 to 3,000 centimeters per second has been found to be satisfactory. The reactor is preferably insulated to permit the reaction to take place under adiabatic conditions. Alternatively, non-adiabatic conditions can be employed wherein conventional heat exchange techniques are employed to maintain the reaction temperature, making appropriate adjustments in the heat capacity of the reaction mixture by regulating the proportion of diluent employed.

The actual mixing of the vaporized reactants can be accomplished in a nozzle which in turn injects the mixture into the chlorinating reactor. Alternatively, the mixed vapors of pyrazine compound and diluent and gaseous chlorine may be simultaneously but separately introduced into the reactor; in such a case, for optimum yields the chlorine must be jetted in close to the point of introduction of the pyrazine compound and in such a manner to ensure very rapid mixing and turbulent flow of the reactants. The vapors passing from the reactor are cooled or quenched to separate (a) a liquid mixture comprising polychlorinated vinyl pyrazine products, diluent and unreacted or partially reacted pyrazine compounds from (b) a gaseous mixture comprising chlorine and hydrogen chloride by-product. The liquid mixture may be fractionally distilled to recover the desired products in substantially pure form or may be cooled to precipitate the product which is then recovered as by filtration. The product whether recovered by distillation or by precipitation and filtration may be further purified, if desired, by methods well-known to the skilled in the art.

Any suitable reactor may be employed and, since the reaction is exothermic, strong heating is required only at the initiation of the reaction. Thereafter heat input is only necessary to compensate for heat loss to the environment. The inlets, outlets and interior surfaces of the reactor must be of materials which resist corrosive attack by chlorine and hydrogen chloride at high temperatures. Thus, for example, such surfaces may be nickel, carbon, silica or glass. In practice, it has been found that thermally resistant, high-silica glass such as Vycor brand is satisfactory.

DESCRIPTION OF SOME PREFERRED EMBODIMENTS

The following examples illustrate the present invention and the manner by which it can be practiced but, as such, should not be construed as limitations upon the overall scope of the same.

Example I — Perchlorovinylpyrazine

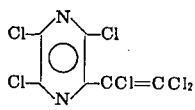

A cylinder of Vycor high-silica glass of 8.2 centimeters in diameter and about 41 centimeters in length was tapered to inlet and outlet tubes and fitted with electrical heating coils and efficient insulation to serve as a reactor having a capacity of about 2.2 liters. The outlet was connected to a coolable collection vessel and the latter was vented through a reflux condenser to an acid-gas recovery system. The inlet tube ended in a nozzle projecting about 2.5 cm into the reactor and having an opening into the reactor about 2.5 millimeters in diameter. Inside the nozzle was a smaller concentric tube for chlorine introduction ending 1.25 centimeters before said nozzle opening. The upstream end of the inlet tube connected to an electrically heated vaporizer-preheater tube.

A prevaporized solution consisting of 10 percent by weight of vinyl pyrazine in carbon tetrachloride was passed from the preheater tube to the inlet nozzle of the reactor at a rate of 6 grams per minute and was rapidly mixed with chlorine gas being introduced at a rate of 5.1 grams per minute. The reactant mixture was forced through the nozzle into the reactor at a velocity of about 2,700 centimeters per second. The molar ratio of chlorine to vinyl pyrazine in the reaction mixture was about 13 moles of chlorine per mole of vinyl pyrazine. The reaction was carried out at a reactor temperature of 580° C. with a residence time of 17 seconds. The reaction was continued for a total of 20 minutes. The excess chlorine and HCl by-product were removed by evaporation from the product mass in the collector vessel and the remaining solution treated with charcoal and concentrated.

The perchlorovinylpyrazine product was recovered by vacuum distillation and boiled at 85°–91° at 0.06 millimeters of mercury. Upon analysis, the product was found to have carbon, hydrogen, chlorine and nitrogen contents of 22.9, 0.0, 67.9 and 8.9 percent, respectively, as compared to the theoretical contents of 23.0, 0.0, 68.0 and 9.0 percent, respectively, calculated for the above-named structure.

The following compounds of the present invention are prepared in accordance with methods hereinbefore set forth.

3,6-Dichloro-2,5-bis(trichlorovinyl)pyrazine having a molecular weight of 407.75 prepared by the vapor phase chlorination of 2,5-diethylpyrazine;

3,5-Dichloro-2,6-bis(trichlorovinyl)pyrazine having a molecular weight of 407.75 prepared by the vapor phase chlorination of 2,6-diethylpyrazine;

5,6-Dichloro-2,3-bis(trichlorovinyl)pyrazine having a molecular weight of 407.75 prepared by the vapor phase chlorination of 2,3-diethylpyrazine.

In accordance with the present invention, it has been discovered that the perchlorovinylpyrazine compounds can be employed as pesticides for the control of many bacterial, fungal, plant and insect pests. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles or cellulosic materials to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium or upon plant foliage or insects. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to apply the compounds as wettable powders.

In a representative operation, perchlorovinylpyrazine was found to give 100 percent kill and control of the plants pigweed, wild mustard, crabgrass and yellow foxtail when applied as the sole toxicant and as an aqueous dispersion pre-emergent to said plant species at a dosage rate equal to 20 pounds per acre.

In another operation, perchlorovinylpyrazine when employed as the sole toxicant in a nutrient agar at a concentration of about 500 parts by weight of the compound per million parts of agar, was found to give 100 percent kill and control of the organisms *Staphylococcus aureus, Candida albicans, Trichophton mentagrophytes, Bacillus subtilis, Aspergillus terreus, Candida pelliculosa, Pullularia pullulans, Mycobacterium phlei, Ceratocystis* ips. and *Cephaloascus fragans.*

In another operation, perchlorovinylpyrazine, when employed as the sole toxicant in an aqueous dispersion at a concentration of 0.00001 percent by weight of the ultimate dispersion, was found to give 100 percent kill and control of yellow fever mosquito larva. In an additional operation, this compound gave 100 percent control of yellow fever mosquito adults at a concentration of 10 parts by weight of the compound per million parts by weight of the ultimate dispersion.

What is claimed is:

1. A compound corresponding to the formula

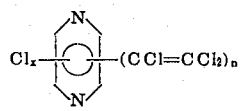

wherein $x$ is 2 or 3, $n$ is 1 or 2 and the sum of $x+n$ is always 4.

2. The compound of claim 1 which is perchlorovinylpyrazine corresponding to the formula

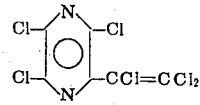

* * * * *